(12) United States Patent
Foster et al.

(10) Patent No.: US 9,285,656 B2
(45) Date of Patent: Mar. 15, 2016

(54) SYSTEM FOR DETERMINING A LENS POSITION

(71) Applicant: Sensors Unlimited, Inc., Princeton, NJ (US)

(72) Inventors: John T. Foster, Morrisville, PA (US); Michael Delamere, Princeton, NJ (US); John P. Barby, Robbinsville, NJ (US)

(73) Assignee: Sensors Unlimited, Inc., Princeton, NJ (US)

( * ) Notice: Subject to any disclaimer, the term of this patent is extended or adjusted under 35 U.S.C. 154(b) by 63 days.

(21) Appl. No.: 14/326,113

(22) Filed: Jul. 8, 2014

(65) Prior Publication Data

US 2016/0011492 A1 Jan. 14, 2016

(51) Int. Cl.
| | |
|---|---|
| *G03B 13/32* | (2006.01) |
| *G03B 13/36* | (2006.01) |
| *G02B 13/00* | (2006.01) |
| *H04N 5/33* | (2006.01) |

(52) U.S. Cl.
CPC ............... *G03B 13/36* (2013.01); *G02B 13/00* (2013.01); *H04N 5/33* (2013.01)

(58) Field of Classification Search
CPC .......... G03B 13/32; G03B 35/08; G02B 7/04; H04N 13/0239
See application file for complete search history.

(56) References Cited

U.S. PATENT DOCUMENTS

| | | | | |
|---|---|---|---|---|
| 4,816,859 | A * | 3/1989 | Maruyama et al. | 396/79 |
| 5,291,335 | A * | 3/1994 | Ogino | 359/696 |
| 5,317,351 | A * | 5/1994 | Takahara et al. | 396/81 |
| 6,148,151 | A * | 11/2000 | Bauer | 396/56 |
| 2009/0010635 | A1* | 1/2009 | Strandemar et al. | 396/133 |
| 2009/0207236 | A1* | 8/2009 | Feda | 348/47 |
| 2012/0207401 | A1* | 8/2012 | Archer | 382/254 |

* cited by examiner

*Primary Examiner* — W B Perkey
(74) *Attorney, Agent, or Firm* — Locke Lord LLP; Scott D. Wofsy; Arpita G. Buesing

(57) ABSTRACT

A system for determining lens position including a first capacitor plate disposed on a stationary housing of a camera. A second capacitor plate is disposed on a rotating lens component of the camera. A processor is operatively connected to the first and second capacitor plates to identify the position of the lens of the camera based on capacitance between the first and second capacitor plates.

15 Claims, 3 Drawing Sheets

SYSTEM FOR DETERMINING A LENS POSITION

GOVERNMENT RIGHTS STATEMENT

This invention was made with government support under contract number HR0011-13-C-0068 awarded by Defense Advanced Research Projects Agency. The government has certain rights in the invention.

BACKGROUND OF THE INVENTION

1. Field of the Invention

The present disclosure relates to optics, and more particularly to determining the lens position within a camera.

2. Description of Related Art

A variety of systems can be used to determine the position of a lens in an optical system. For example, in a typical consumer autofocus camera, an electrical motor can be used to move a lens and the control signals to the motor can be used to infer the final position of the lens. However, autofocus systems such as these can consume a relatively high amount of power, and can have limited accuracy.

Knowing the position of a lens in an optical system can be important in determining the distance to an object being imaged. One example of a use for knowing the distance to the object is for parallax correcting images taken from different viewpoints.

Such conventional methods and systems have generally been considered satisfactory for their intended purpose. However, there is still a need in the art for improved systems and methods for determining lens position. The present disclosure provides a solution for this need.

SUMMARY OF THE INVENTION

A system for determining lens position includes a first capacitor plate disposed on a stationary housing of a camera. A second capacitor plate is disposed on a rotating lens component of the camera. A processor is operatively connected to the first and second capacitor plates to identify the position of the rotating lens component of the camera based on capacitance between the first and second capacitor plates. In certain embodiments, the system can include a second camera operatively connected to the processor such that the first camera can be a long wavelength infrared camera and the second camera can be a short wavelength infrared camera.

The system can further include a memory operatively connected to the processor. The memory can include program instructions to calculate a distance to a point of focus of the camera based on a position of the rotating lens component using an area of overlap between the first and second capacitor plates. The memory can include instructions recorded thereon that, when read by the processor, cause the processor to parallax correct an image from the second camera based on the distance between the point of focus to the focal plane of the camera and the area of overlap between the first and second capacitor plates.

A camera includes a housing and a lens rotatable relative to the housing. A first capacitor plate is disposed on the housing. A second capacitor plate is disposed on the rotating lens component. A processor is operatively connected to the first and second capacitor plates to identify the position of the rotating lens component of the camera based on a capacitance between the first and second capacitor plates.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
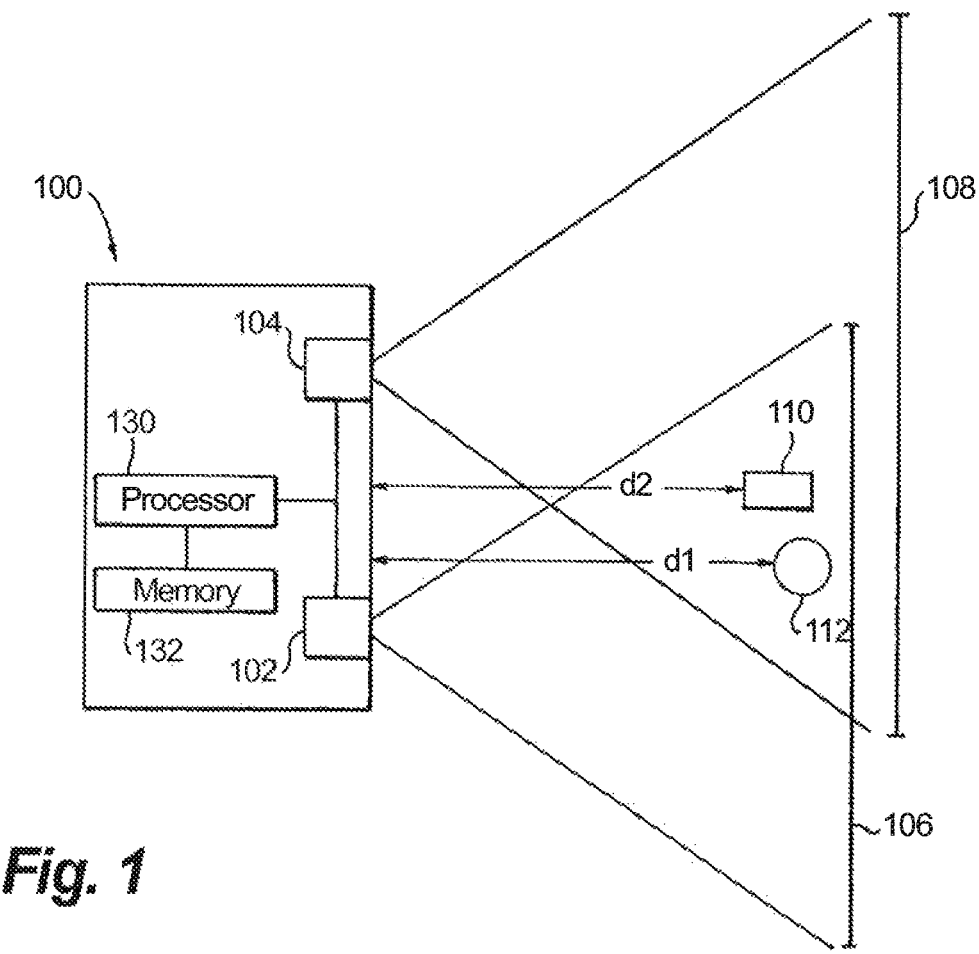
FIG. 1 is a schematic of an exemplary embodiment of a system for determining lens position constructed in accordance with the present disclosure, showing first and second cameras.

Reference will now be made to the drawings wherein like reference numerals identify similar structural features or aspects of the subject disclosure. For purposes of explanation and illustration, and not limitation, a partial view of an exemplary embodiment of a system for identifying lens position in accordance with the disclosure is shown in FIG. 1 and is designated generally by reference character 100. Other embodiments of systems in accordance with the disclosure, or aspects thereof, are provided in FIGS. 2-5, as will be described.

With reference to FIG. 1, a system 100 is shown that can determine the lens position of a first camera and electronically determine distance to a point of focus to correct parallax between multiple cameras. The point of focus of a lens system is controlled by moving a lens element or component relative to the image plane location using either a threaded barrel housing the lens system, a cam surface and a follower, or the like. The rotation of the lens system is directly translated into linear motion of the lens component along the optical axis, with respect to the image plane.

FIG. 1 illustrates overlapping fields of view 106, 108 of first and second cameras 102, 104 which are laterally spaced a constant distance apart relative to each other. The first and second cameras 102, 104 are spaced apart along a common plane. As will be understood by those skilled in the art, first and second cameras 102, 104 can be positioned relative to each other in any other suitable way. The first and second cameras 102, 104 can focus on objects 110, 112 a distance d1, d2, respectively, for displaying on a screen, for example, a heads-up display. The first camera 102 can be a long wavelength infrared camera (LWIR). The second camera 104 can be a short wave infrared camera (SWIR). The first and second cameras 102, 104 include a housing 120 (shown in FIG. 3) and a lens component 124 manually rotatable relative to the housing 120. Images displayed from the second camera 104 are altered to produce a parallax corrected composite image on a display screen including image information from both cameras 102, 104.

The term parallax as used herein includes the displacement due to separation between the optical axes. In other words, parallax is based on the separation between the two cameras. The parallax between first and the second images is further dependent on the distance to the object. Therefore, if the distance to the object is known, the parallax between the two images can be determined and used to adjust one or both of the images. For example, the pixels of one image may be translated to compensate for parallax. For example, a composite image showing features of both the LWIR camera 102 and the SWIR camera 104 can be produced with parallax correction so LWIR and SWIR features are properly aligned in the composite image. As will be understood, the parallax may differ for different parts of the images, if the distance to the imaged object or area varies within the image. The parallax may be determined for only one part of the image or independently for different parts of the image. If the parallax is determined for only one part of the image, this part can be determined in different ways. For example, the central portion of the image can be selected by default. As another example, it may be possible for an operator to select a portion of the image for which the parallax should be determined, for example, the portion containing an object of interest.

Figure 2:
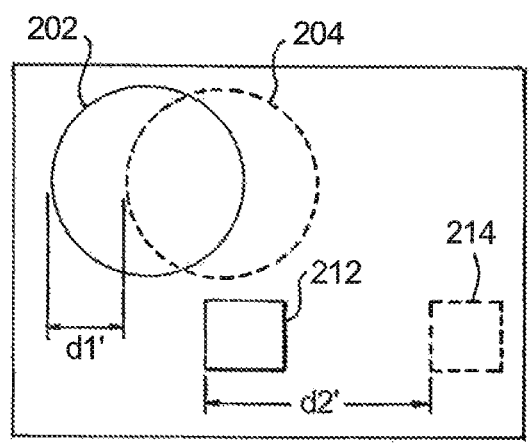
FIG. 2 is a schematic view of the images received from the first and second cameras of FIG. 1, showing parallax.

FIG. 2 schematically illustrates images produced by the first and second cameras 102, 104 of system 100 prior to correcting for parallax. First image portions 202, 212 imaged by the first camera 102 and second image portions 204, 214 imaged by the second camera 104, are taken of the same scene at the same time. Images 202 and 212 are essentially the same as images 204 and 214, respectively, but are slightly shifted with respect to each other because of the distance between the first and second cameras 102, 104. For simplicity, the objects shown are a circle 112 and a square 110. In FIG. 1, the circle 112 is farther away from the cameras 102, 104 than the square 110. Therefore, the displacement d2' of the images of the squares 212, 214 is greater than the displacement d1' of the images of the circles 202, 204. The pixels of images 204, 214 from the second camera 104 can be translated horizontally a distance d1' and d2' to create a composite image showing the features of the first and second cameras 102, 104 corrected for parallax.

Figure 3:
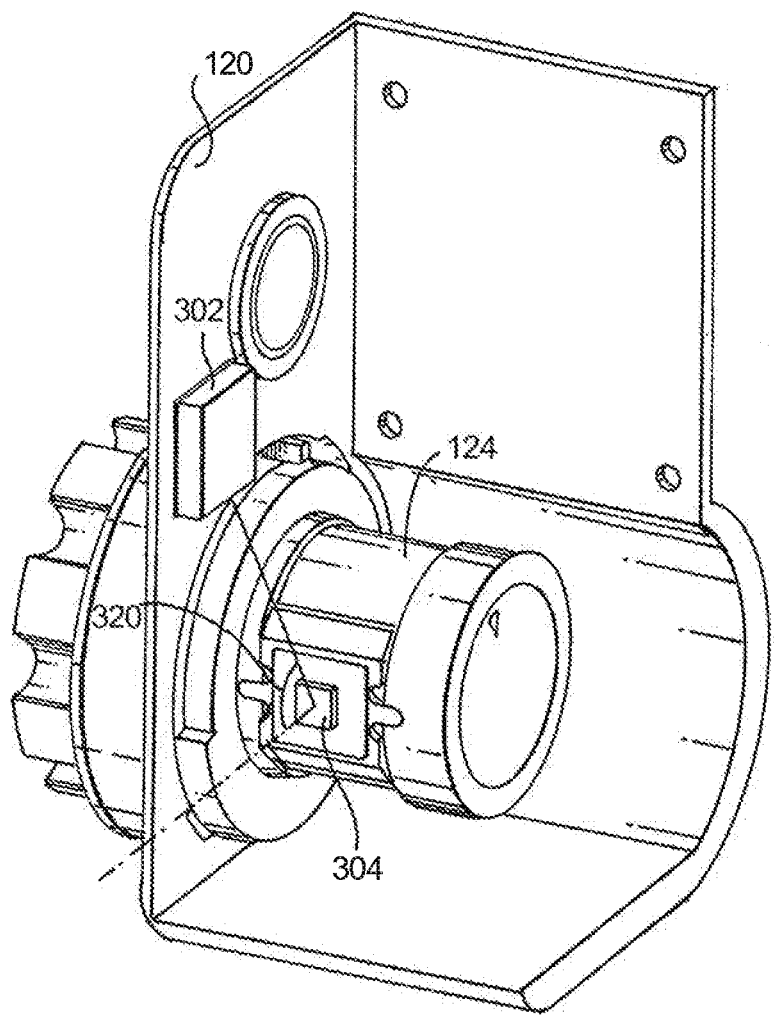
FIG. 3 is a cutaway perspective view of a portion of the system of FIG. 1, showing sensor components disposed on the first camera.

In order to determine the distances d1', d2' required to translate pixels from the second camera 104, the respective distances d1 and d2 to the objects 110, 112 from the first camera 102 must be determined. In the present disclosure, and as described in more detail below, the distances d1 and d2 to the point of focus 110, 112 of the first camera 102 are determined based on the rotatable lens component position when the first camera 102 is focused on objects 110, 112. FIG. 3 shows first camera 102 of system 100. System 100 for determining lens position is based on the axial position of the lens relative to the housing 120 of camera 102. A first sensor component 302 is disposed on the housing 120 of the first camera 102. A second sensor component 304 is disposed on the rotating lens component 124 of the first camera 102. The first and second sensors 302,304 are each operatively connected to a processor 130 (shown in FIG. 1). The sensor components 302, 304 can be magnetic sensors, for example, lightweight magneto-resistive sensors. The lens component is shown and described as a rotating lens component, however a slidable lens that translates forward and backward with respect to the camera housing is also contemplated.

Rotation of the lens component 124 relative to the housing 120 causes the rotatable lens component 124 to move in a direction transverse to the housing 120 and closer to objects 110, 112. Once the rotatable lens component 124 is circumferentially rotated a desired distance to focus on objects 110, 112, sensor component 302 generates a signal based on the strength and direction of the magnetic field caused by the other, which is indicative of the relative position of sensor component 304. The position of the sensor component 304 can then be determined by the processor 130. The processor 130 calculates distances d1 and d2 from the first camera 102 based on the angle of rotation 320 between the first and second sensor components 302, 304. More specifically, the angle of rotation 320 between the two sensor components 302, 304 is used by the processor 130 to calculate the position of the rotatable lens component 124, which is used to infer distances d1 and d2 to the objects 110 and 112, respectively. The use of an angular measurement provides a method of accurately determining lens position. In typical camera systems, the distance over which a lens system moves is extremely small relative to the very large shift in position of the point of focus. One full rotation could correspond to a very small translation in lens position. For example, one full rotation may move the lens system 0.5 mm. One degree of rotation would then correspond to 0.0014 mm, or 1.4 microns, of motion in the lens system. While it is very difficult to measure movement of only 1.4 microns, it is much simpler to measure one degree of rotation accurately.

The operation of processor 130 may be controlled with computer executable instructions, i.e., a program carrying instructions which can be executed by the processor. One or more memory units, here shown as memory 132, are operatively connected to the processor 130. The memory 132 is used to store computer executable instructions to be executed by the processor 130 when performing the functions of system 100 described herein.

With reference to FIG. 1, the second camera 104 is operatively connected to the processor 130. Once the processor 130 calculates the distances d1 and d2, the processor 130 parallax corrects one or both images, for example, images 204, 214. In other words, the pixels of the images 204 and 214 viewed from the second camera 104 are translated to align with the corresponding images 202 and 212 of the first camera 102. In this manner, a parallax corrected composite image including features from the first and second cameras 102, 104 is shown on the display screen. This allows images in two different spectra, e.g., LWIR and SWIR, to be composited to show useful information from both.

Figure 4:
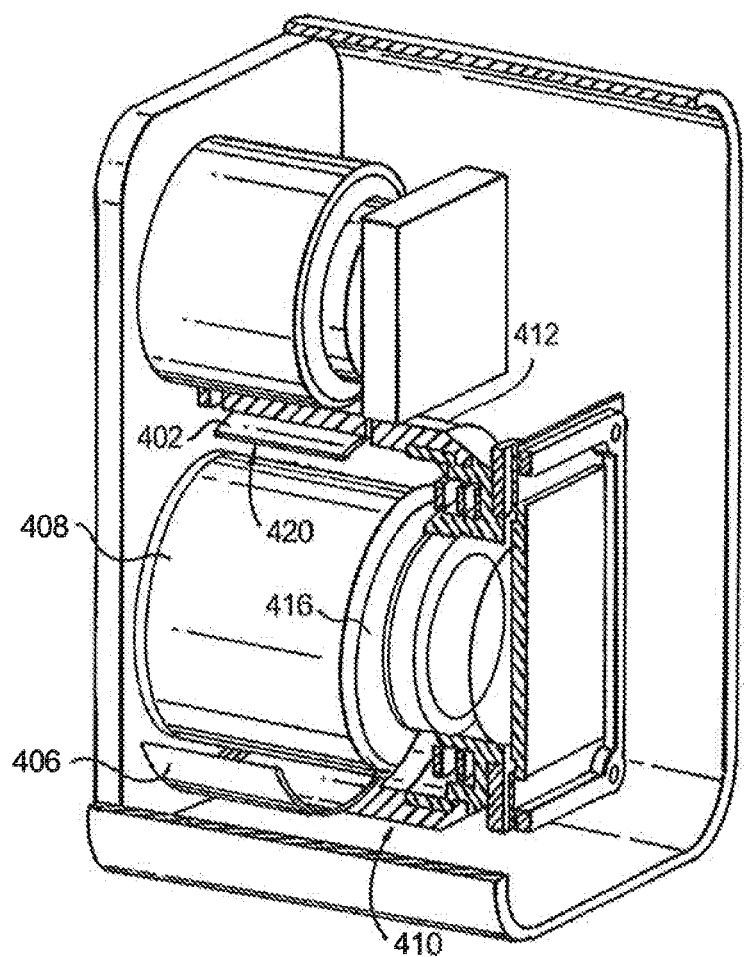
FIG. 4 is a cutaway perspective view of another exemplary embodiment of a first camera showing sensor components having capacitor plates disposed in the first camera to form a variable capacitor.
Figure 5:
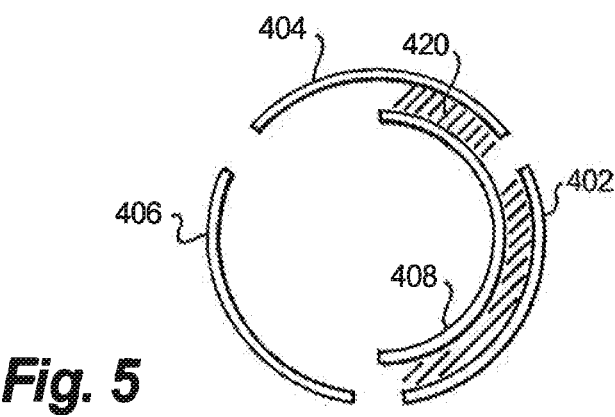
FIG. 5 is a schematic axial end view of an exemplary embodiment of a lens position sensor, showing a system with four capacitor plates.

With reference to FIGS. 4 and 5, a first camera 102 for calculating the distance to the point of focus from the first camera 102 is shown with a different embodiment of sensor components. In this embodiment, an array of capacitor plates 402, 404, 406 are disposed on a lens barrel assembly 410. In this embodiment, three capacitor plates 402, 404 and 406 are shown to comprise the array of capacitor plates, however it will be understood that any suitable number of plates can be used.

A rotating capacitor 408 plate is disposed on a rotating lens component 416 of a lens barrel assembly 410. Capacitor plates 402, 404 and 406 are positioned on a stationary lens barrel 412. Each of the capacitor plates 402, 404, 406, 408, is operatively connected to the processor 130. By placing the capacitor plates 402, 404, 406, 408 in this configuration, the capacitor plates 402, 404, 406, 408 create a variable capacitor system in which capacitance varies based on the position of the rotating lens component 416 in relation to the stationary lens barrel 412. The electrical capacitance, and thus measured electrical charge, of any of the three capacitor plates, is proportional to the amount of area overlap between the rotating capacitor 408 and any given capacitor of the array. As shown, the array of capacitor plates 402, 404, 406 is positioned circumferentially surrounding the rotating capacitor plate 408. As such the area of overlap 420 can extend between one or more of the capacitor plates 402, 404, 406. The capacitance is used by processor 130 to calculate the angle of rotation of the rotating lens component 416 and thus the distance to the point of focus. FIG. 5 shows schematically three capacitor plates 402, 404, 406. Each capacitor plate 402, 404, 406 extends approximately 120° degrees around the rotating plate 408.

The methods and systems of the present disclosure, as described above and shown in the drawings, provide for a system for identifying lens position with superior properties including correcting for parallax between two cameras based on the lens position. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A system for determining lens position, comprising:
   a stationary lens barrel of a camera;
   a rotating lens component mounted for rotation relative to the lens barrel;
   a first capacitor plate disposed on the rotating lens component;
   three circumferentially spaced capacitor plates disposed on the stationary lens barrel surrounding the first capacitor plate; and
   a processor operatively connected to each of the capacitor plates to identify the position of the rotating lens component of the camera based on capacitance between the first capacitor plate and the stationary capacitor plates.

2. The system of claim 1, further comprising a memory operatively connected to the processor including program instructions to calculate a point of focus of the camera based on an area of overlap between the first capacitor plate and the stationary capacitor plates.

3. The system of claim 2, further including a second camera in electronic communication with the processor wherein the memory includes program instructions to transform an image from the second camera to align with an image from the camera.

4. The system of claim 3, wherein the camera is a long wavelength infrared camera.

5. The system of claim 4, wherein the second camera is a short wavelength infrared camera.

6. The system of claim 1, wherein the processor is operatively connected to a memory, wherein the memory includes instructions recorded thereon that, when read by the processor, cause the processor to:
   calculate a distance from a point of focus to a focal plane of a camera based on a position of the rotating lens using capacitance as a result of an area of overlap between the first capacitor plate and the stationary capacitor plates.

7. The system as recited in claim 6, wherein the memory includes instructions recorded thereon that, when read by the processor, cause the processor to:
   parallax correct an image from a second camera based on the distance between the point of focus to the focal plane of the camera and the area of overlap between the first capacitor plate and the stationary capacitor plates.

8. A camera, comprising:
   a stationary lens barrel;
   a lens component rotatable relative to the lens barrel;
   a first capacitor plate disposed along a circumference of the rotatable lens component;
   three circumferentially spaced capacitor plates disposed on the stationary lens barrel surrounding the first capacitor plate; and
   a processor operatively connected to each of the capacitor plates to identify the position of the rotatable lens component of the camera based on a capacitance between the first capacitor plate and the stationary capacitor plates.

9. The camera of claim 8, further comprising a memory operatively connected to the processor including program instructions to calculate a point of focus of the camera based on an area of overlap between the first capacitor plate and the stationary capacitor plates.

10. The camera of claim 9, further including a second camera in electronic communication with the processor wherein the memory includes program instructions to transform an image from the second camera to align with an image from the camera.

11. The camera of claim 10, wherein the camera is a long wavelength infrared camera.

12. The camera of claim 11, wherein the second camera is a short wavelength infrared camera.

13. The camera of claim 9, wherein the processor is operatively connected to a memory, wherein the memory includes instructions recorded thereon that, when read by the processor, cause the processor to:
   calculate a distance from a point of focus to a focal plane of a camera based on a position of the rotating lens using capacitance as a result of an area of overlap between the first capacitor plate and the stationary capacitor plates.

14. The camera as recited in claim 13, wherein the memory includes instructions recorded thereon that, when read by the processor, cause the processor to:
   parallax correct an image from a second camera based on the distance between the point of focus to the focal plane of the camera and the area of overlap between the first capacitor plate and the stationary capacitor plates.

15. The system as recited in claim 1, wherein the three stationary capacitor plates are arranged in a circle with the first capacitor plate inside the circle of the stationary capacitor plates.

* * * * *